(12) United States Patent
Ohsawa

(10) Patent No.: US 6,424,126 B1
(45) Date of Patent: Jul. 23, 2002

(54) PROPULSION SYSTEM OF A VEHICLE HAVING TWO FLYWHEELS WITH DIFFERENT MOMENTS OF INERTIA

(75) Inventor: Hiroshi Ohsawa, Shizuoka-ken (JP)

(73) Assignee: Suzuki Motor Corporation, Shizouka-ken (JP)

( * ) Notice: Subject to any disclaimer, the term of this patent is extended or adjusted under 35 U.S.C. 154(b) by 0 days.

(21) Appl. No.: 09/655,808

(22) Filed: Sep. 6, 2000

(30) Foreign Application Priority Data

Sep. 6, 1999 (JP) ............................................ 11-251211

(51) Int. Cl.⁷ .......................... H02K 7/02; H02K 21/22; H02K 1/12; H02P 9/04; H02P 11/00; B60K 1/00; B60K 16/00

(52) U.S. Cl. ........................... 322/4; 310/153; 310/254; 322/16; 322/14; 180/65.1; 180/65.3

(58) Field of Search ................ 74/572, 574; 123/195 P, 123/195 R; 192/70.16, 70.17; 322/4; 60/718; 180/65.1–65.8

(56) References Cited

U.S. PATENT DOCUMENTS

| | | | | |
|---|---|---|---|---|
| 3,609,426 A | * | 9/1971 | Gaul ........................... | 310/112 |
| 3,805,514 A | * | 4/1974 | Bodine ......................... | 60/741 |
| 4,400,804 A | * | 8/1983 | Konrad ......................... | 367/137 |
| 4,727,970 A | * | 3/1988 | Reik et al. .............. | 192/110 B |
| 4,817,775 A | * | 4/1989 | Baccalaro et al. ........ | 192/89 B |
| 4,842,116 A | * | 6/1989 | Fukushima ............... | 192/214.1 |
| 4,958,095 A | * | 9/1990 | Uchida et al. ................ | 310/59 |
| 4,965,998 A | * | 10/1990 | Estigoy et al. ................ | 60/325 |
| 5,069,321 A | * | 12/1991 | Reik et al. ................ | 192/70.17 |
| 5,598,910 A | * | 2/1997 | Moroto et al. ............. | 192/48.2 |
| 5,636,553 A | * | 6/1997 | Gobel et al. ................... | 74/574 |
| 5,773,904 A | * | 6/1998 | Schiebold et al. ............ | 310/92 |
| 5,992,593 A | * | 11/1999 | Yamamoto ................... | 192/48.1 |
| 6,044,727 A | * | 4/2000 | Yamamoto ..................... | 47/574 |
| 6,283,864 B1 | * | 9/2001 | Reik et al. .............. | 192/110 B |
| 6,311,495 B1 | * | 11/2001 | Shimizu et al. ........ | 123/DIG. 8 |
| RE37,465 E | * | 12/2001 | Reik et al. ................ | 192/113.4 |

FOREIGN PATENT DOCUMENTS

| | | | |
|---|---|---|---|
| GB | 002085381 A | * | 4/1982 |
| JP | 359153137 A | * | 9/1984 |
| JP | 62-29979 | | 6/1987 |
| JP | 8-233035 | | 9/1996 |
| JP | 9-215270 | | 8/1997 |
| JP | 2708469 | | 10/1997 |
| JP | 02001074107 A | * | 3/2001 |

* cited by examiner

*Primary Examiner*—Nestor Ramirez
*Assistant Examiner*—Julio C. Gonzalez
(74) *Attorney, Agent, or Firm*—Flynn, Thiel, Boutell & Tanis, P.C.

(57) ABSTRACT

A propulsion system for a vehicle designed for reduced torsional vibration of an engine as well as lighter weight of the system. The propulsion system includes a first flywheel mounted on a crankshaft of an engine at an output end of the crankshaft, the engine being disposed in the vehicle, and a motor disposed on the first flywheel on the output side thereof. The motor has a dual function of driving and electric power generation. Further, a second flywheel is disposed on the motor on the output side thereof, and a transmission is disposed in communication with the output side of the second flywheel through a clutch. The first flywheel has an inertial moment which is greater than that of the second flywheel.

19 Claims, 4 Drawing Sheets

PROPULSION SYSTEM OF A VEHICLE HAVING TWO FLYWHEELS WITH DIFFERENT MOMENTS OF INERTIA

FIELD OF THE INVENTION

This invention relates to a propulsion system for a vehicle. More particularly, it relates to a propulsion system for a vehicle, designed for reduced torsional vibration of an engine as well as lighter weight of the system.

BACKGROUND OF THE INVENTION

One known type of propulsion system for a vehicle has an engine provided therein as a power source, and further has a transmission disposed therein in communication with a crankshaft of the engine through a clutch. Another type of propulsion system has both an engine and a motor disposed therein as a power source. The motor has a dual function of driving and electric power generation. The latter propulsion system adds the driving force of the motor to that of the engine in response to an engine operating status in order to achieve increased output, improved fuel efficiency, and a reduced rate of detrimental exhaust emission components.

Such propulsion systems are disclosed in published Japanese Patent Application Examined No. 62-29979, granted Patent No. 2708469, Japanese Patent Application Laid-Open No. 9-215270, and Japanese Patent Application Laid-Open No. 8-233035.

According to Application No. 62-29979, an engine has an electromagnetic retarder mounted on a crankshaft and a flywheel disposed on the output side of the retarder.

According to U.S. Pat. No. 2,708,469, a revolving field pole of a charging and generating apparatus is mounted on a drive plate of an automatic transmission. The apparatus is disposed between an engine crankshaft and an automatic transmission input shaft.

According to Application No. 9-215270, an electric motor having a plate-like rotor formed thereon is disposed between an engine crankshaft and an automatic transmission input shaft. The rotor is mounted on the crankshaft.

According to Application No. 8-233035, a flywheel to be mounted on an engine crankshaft is divided into first and second flywheel elements. The first flywheel element is located on the input side of the engine, while the second flywheel element is positioned on the output side of the engine. The first flywheel element includes a damper.

In some prior art propulsion systems, a first flywheel is provided on a crankshaft of an engine at an output end of the crankshaft; a motor is disposed on the first flywheel on the output side thereof, which motor has a dual function of driving and electric power generation; a second flywheel is disposed on the motor on the output side thereof; and, a transmission is disposed in communication with the output side of the second flywheel through a clutch.

This type of a propulsion system transmits the driving force of the engine to the transmission through the crankshaft, the first flywheel, the second flywheel, and the clutch. At the same time, the propulsion system adds the driving force of the motor to that of the engine in dependence upon an engine operating status in order to provide increased output, improved fuel efficiency, and a reduced rate of harmful exhaust emission components.

The propulsion system suffers from a problem in which torsional vibration occurs in the crankshaft during engine operation. The torsional vibration results from a conflict between forces from a reciprocating portion (or, a piston) of the engine and forces from the flywheel having a great moment of inertia. In view of the torsional vibration of the crankshaft, it is advantageous to position the flywheel near the crankshaft as close as possible.

However, the propulsion system has the motor disposed on the crankshaft through the first flywheel, and further has the second flywheel disposed between the motor and the clutch. Thus, the second flywheel is spaced apart from the crankshaft. This causes an inconvenience in that such positioning of the second flywheel is disadvantageous in view of the torsional vibration of the engine. Further, the propulsion system includes the first flywheel positioned close to the crankshaft and the second flywheel distant from the crankshaft. This brings about another inconvenience in that such flywheel positioning is disadvantageous in view of weight.

In order to obviate or at least minimize the above inconveniences, the present invention provides a propulsion system for a vehicle, having a first flywheel mounted on a crankshaft of an engine at an output end of the crankshaft, the engine being disposed in the vehicle, a motor disposed on the first flywheel on the output side thereof, the motor having a dual function of driving and electric power generation, a second flywheel disposed on the motor on the output side thereof, and a transmission disposed in communication with the output side of the second flywheel through a clutch, the improvement wherein the first flywheel has inertial moment greater than that of the second flywheel.

In the propulsion system according to the present invention, the inertial moment of the first flywheel disposed near the crankshaft is set to be greater than the inertial moment of the second flywheel spaced apart from the crankshaft. As a result, the first flywheel having greater inertial moment is positioned closer to the crankshaft. This is advantageous in view of torsional vibration of the engine. Furthermore, the second flywheel distant from the crankshaft is formed by a raw material having a lesser density in order to provide reduced inertial moment. Consequently, the second flywheel made lighter in weight than the first flywheel is achievable.

DETAILED DESCRIPTION

Figure 1:
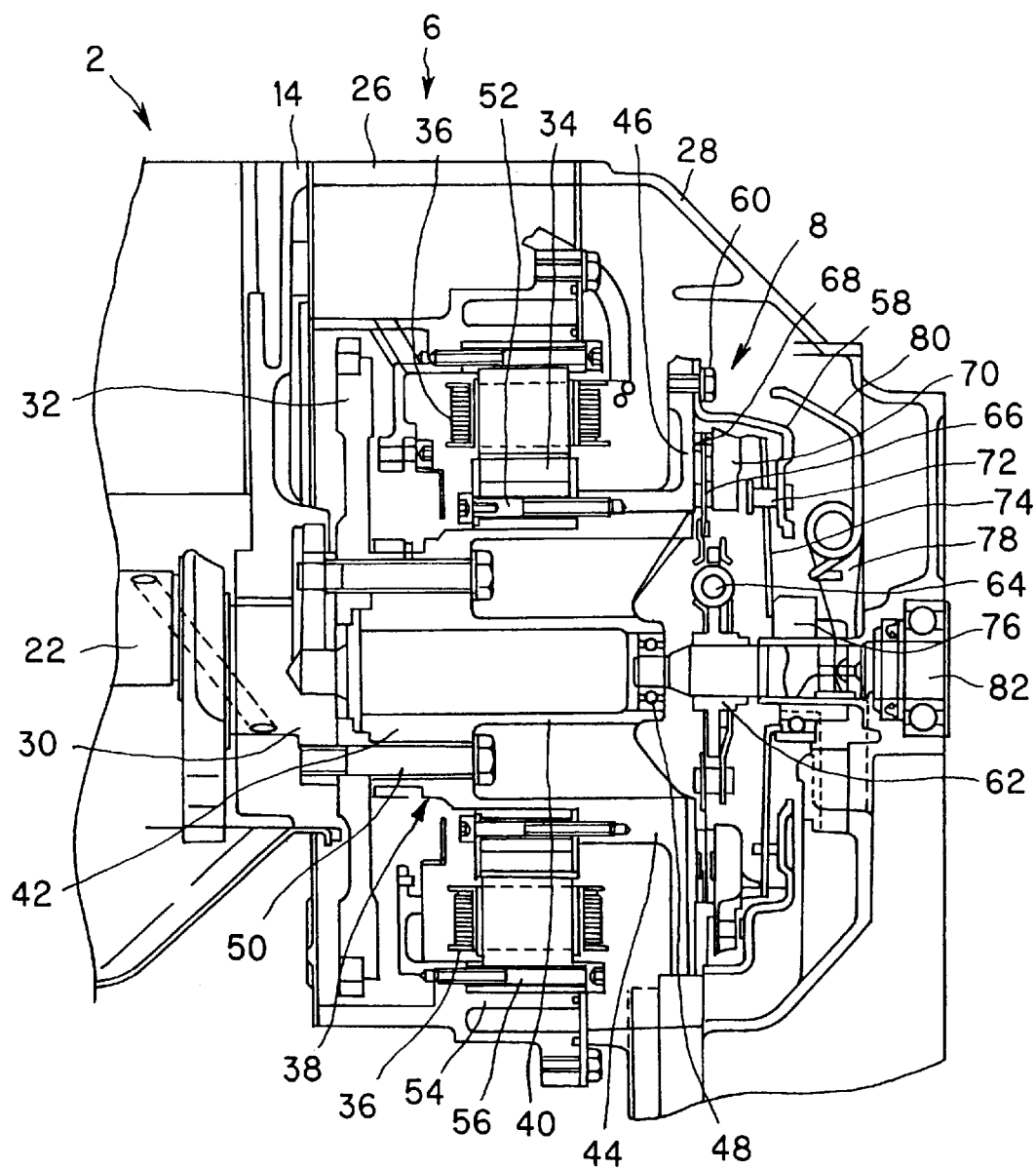
FIG. 1 is an enlarged-cross-sectional view, showing a motor portion of a propulsion system according to a first embodiment of the invention.
Figure 2:
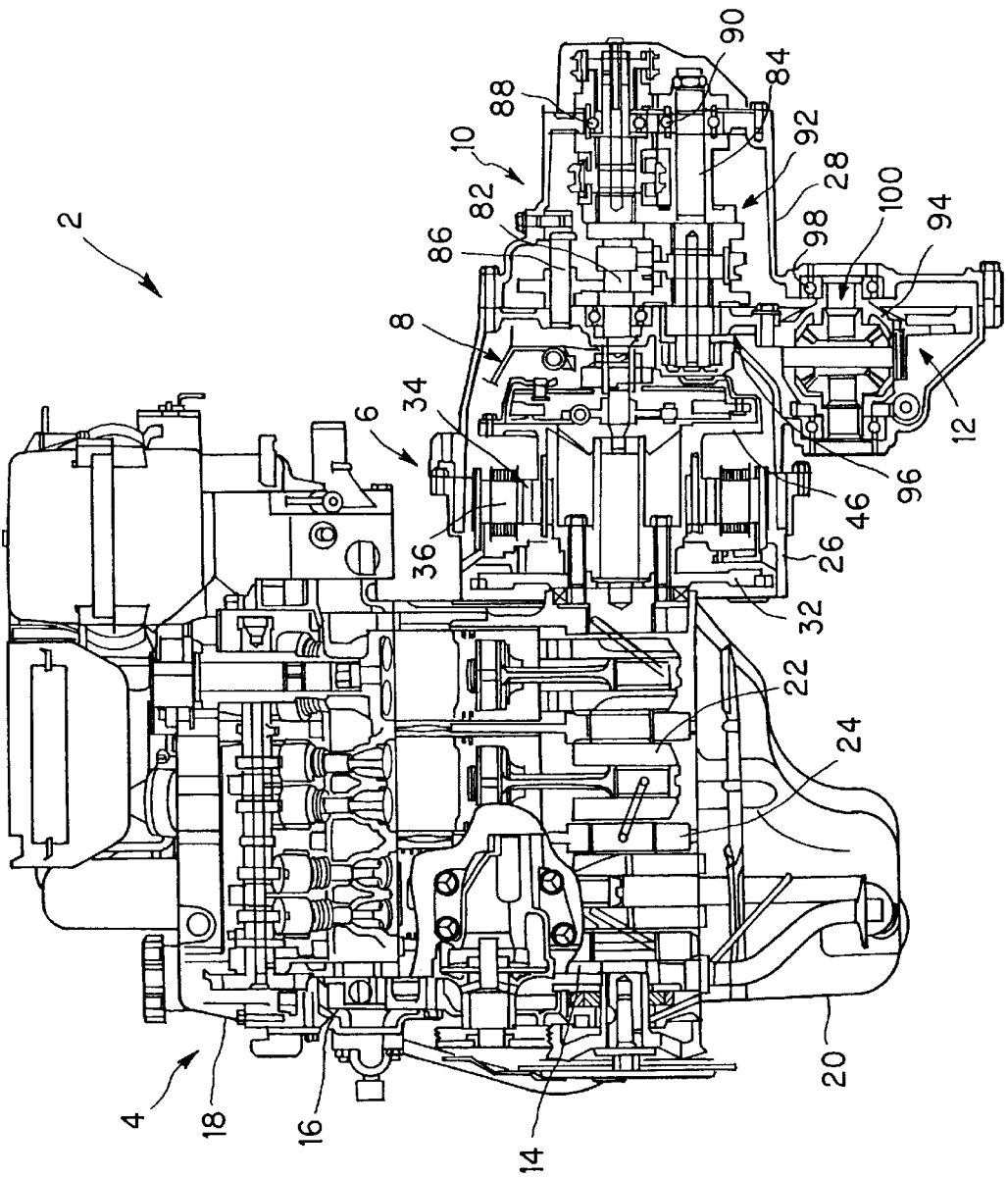
FIG. 2 is a cross-sectional view, illustrating the propulsion system.

Embodiments of the present invention will now be described with reference to the drawings. FIGS. 1 and 2 illustrate a first embodiment. In FIG. 2, reference numeral 2 denotes a propulsion system for a vehicle (not shown). The propulsion system 2 includes an engine 4, a motor 6, a clutch 8, a transmission 10, and a differential gear 12. The motor 6 has a dual function of driving and electric power generation.

The engine 4 includes a cylinder block 14, a cylinder head 16, a head cover 18, and an oil pan 20. The engine 4 has a crankshaft 22 rotatably supported on a lower case 24 under the cylinder block 14. A motor case 26 is mounted on the cylinder block 14 for covering the motor 6. The motor case 26 is positioned on the output side of the crankshaft 22. A transmission case 28 is mounted on the motor case 26 for covering the transmission 10. The transmission case 28 is located on the output side of the motor case 26.

Referring to FIG. 1, a crankshaft-side flange 30 is shown positioned on the crankshaft 22 at one end or an output end thereof. In addition, a first flywheel 32 is shown disposed on the flange 30. The first flywheel 32 is mounted on the flange 30 together with a rotor-mounting member 38 for the motor 6 by means of motor side-mounting bolts 50. Details of the rotor-mounting member 38 will be given below.

The motor 6 is disposed on the flywheel 32 on the output side thereof, and is directly connected to the first flywheel 32. The motor 6 includes a motor rotor 34 and a motor stator (coil) 36. The preceding rotor-mounting member 38 retains the motor rotor 34. The rotor-mounting member 38 is mounted on the crankshaft 22. The motor case 26 holds the motor stator 36 in position.

The rotor-mounting member 38 has an annular motor-side flange 42 provided on a cylindrical inner shaft portion 40. The flange 42 is positioned at one end or on the input side of the inner shaft portion 40. The rotor-mounting member 38 further has a cylindrical outer shaft portion 44 provided on the flange 42. The outer shaft portion 44 extends from an outer edge of the flange 42 toward the output side of the motor 6. In addition, an annular second flywheel 46 is disposed on the outer shaft portion 44. The second flywheel 46 is positioned on the output side of the outer shaft portion 44.

The inner shaft portion 40 is disposed so as to permit an input shaft 82 of the transmission 10 to be rotatably supported on a clutch-side bearing 48. More specifically, the input side of the input shaft 82 rests upon the bearing 48 at the other end or on the output side of the inner shaft portion 40. The motor-side flange 42 is mounted on the crankshaft-side flange 30 together with the first flywheel 32 by means of the mounting bolts 50. The motor rotor 34 is mounted on the outer shaft portion 44 by means of rotor-mounting bolts 52.

A stator-mounting portion 54 is provided on the motor case 26 so as to be opposed to the outer shaft portion 44. The motor stator 36 is mounted on the stator-mounting portion 54 by means of stator-mounting bolts 56 at a position aligned with the motor rotor 34.

Thus, the motor rotor 34 and the rotor-mounting member 38 are provided on the first flywheel 32 on the output side thereof. In addition, the second flywheel 46 is disposed on the motor 6 on the output side thereof.

The transmission 10 is disposed in communication with the output side of the second flywheel 46 through the clutch 8.

The clutch 8 has a clutch cover 58 mounted on the output side of the second flywheel 46 by means of a cover-mounting bolt 60. The clutch cover 58 is disposed at an outer peripheral edge portion of the flywheel 46. The clutch 8 further has a clutch hub 62 provided on the input shaft 82 so as to permit the clutch hub 62 to be axially movable but lockable against rotation. A clutch disk 66 is mounted on the clutch hub 62 through a damper 64.

The clutch 8 further has a clutch surface 68 provided on the output side of the second flywheel 46. The second flywheel output side is opposed to one surface of the clutch disk 66. A pressure plate 70 is disposed so as to face the other surface of the clutch disk 66. A diaphragm spring 74 is provided on the clutch cover 58. The spring 74 is retained by a holder 72 at a central portion of the spring 74 in a radial direction thereof. The pressure plate 70 is positioned against one side of the spring 74 at an outer peripheral edge portion of the spring 74.

The clutch 8 further includes a release bearing 76, a release fork 78, and a release spring 80. The bearing 76 is positioned against the other side of the spring 74 (i.e. the side opposite pressure plate 70) at an inner peripheral edge portion of the spring 74. The bearing 76 is rotatably supported on the input shaft 82 in an axially movable manner. The release fork 78 is swingable to permit axial movement of the bearing 76. The release spring 80 imparts biasing forces to the fork 78.

Thus, the clutch 8 is disposed on the flywheel 46 on the output side thereof.

The transmission 10 is positioned on the clutch 8 on the output side thereof. The transmission 10 has the following shafts disposed in the transmission case 28: the preceding input shaft 82; an output shaft 84; and, a reverse idler shaft 86. The input shaft 82 is rotatably supported on the transmission case 28 by means of the clutch-side bearing 48 and an input shaft-side bearing 88. The output shaft 84 is rotatably supported on the transmission case 28 by means of a counter shaft-side bearing 90. The reverse idler shaft 86 is fixedly secured to the transmission case 28.

In order to provide forward and reverse shifting, the transmission 10 has a speed change gear train 92 disposed between the input shaft 82, the output shaft 84, and the reverse idler shaft 86. The transmission 10 further has an ending speed reduction gear train 96 disposed between an output end of the output shaft 84 and a differential gear case 94 of the differential gear 12. The differential gear 12 has the case 94 rotatably supported on the transmission case 28 by means of a differential gear-side bearing 98. The case 94 houses a differential gear train 100, which communicates with drive shafts (not shown) disposed on the right and left of the engine 4.

Thus, the transmission 10 is provided to permit communication between the input shaft 82 to the output side of the clutch 8. In addition, the differential gear 12 is disposed in communication with the output shaft 84 through the gear train 96. Further, the differential gear 12 communicates with wheels (not shown) through the drive shafts.

As described above, the propulsion system 2 has the first flywheel 32 disposed on the crankshaft 22 at the output end thereof, the motor 6 positioned on the flywheel 32 on the output side thereof, the second flywheel 46 disposed on the motor 6 on the output side thereof, and the transmission 10 positioned in communication with the output side of the second flywheel 46 through the clutch 8.

The propulsion system 2 transmits the driving force of the engine 4 to the first flywheel 32 through the crankshaft 22, then to the second flywheel 46, and further to the transmission 10 through the clutch 8. At the same time, the propulsion system 2 adds the driving force of the motor 6 to that of the engine 4 in accordance with an engine operating status, thereby providing increased output, improved fuel efficiency, and a reduced rate of detrimental exhaust emission constituents.

In the propulsion system 2, the first flywheel 32 has inertial moment "I1", while the second flywheel 46 has inertial moment "I2". The former moment "I1" is set to be greater than the latter moment "I2" (I1>I2).

In this embodiment, in order to set inertial moment "I1" and "I2" in accordance with the relationship of I1>I2, the first flywheel 32 is made of either steel or cast iron having a greater density, while the second flywheel 46 is formed of either an aluminum alloy or a magnesium alloy having a lesser density.

As described above, the propulsion system 2 is characterized in that the inertial moment "I1" of the first flywheel 32 which is positioned adjacent to the crankshaft 22 is set to be greater than inertial moment "I2" of the second flywheel 46 which is spaced apart from the crankshaft 22 (I1>I2). This means that the first flywheel 32 having the greater inertial moment "I1" is disposed closer to the crankshaft 22. This is advantageous in view of torsional vibration of the engine 4.

The propulsion system 2 is further characterized in that the second flywheel 46 distant from the crankshaft 22 is formed of an aluminum or magnesium alloy having a lesser or smaller density in order to provide a reduced moment of inertia. Consequently, a lighter-weight flywheel 46 is achievable when compared with the first flywheel 32.

As a result, the propulsion system 2 realizes a reduction in the torsional vibration of the engine 4 as well as a reduction in overall weight of the propulsion system 2.

As described above, the second flywheel 46 is formed by an aluminum or magnesium alloy having a smaller density. Alternatively, since the second flywheel 46 forms a contact surface of the clutch 8, or rather the clutch surface 68, then the second flywheel 46 may be formed of an aluminum alloy that contains silicon (Si) in an amount of 15% or greater.

The use of the second flywheel 46 as formed in accordance with the above alternative provides reduced torsional vibration of the engine 4, reduced overall weight of the propulsion system 2, and improved abrasion resistance of the second flywheel 46.

Figure 3:
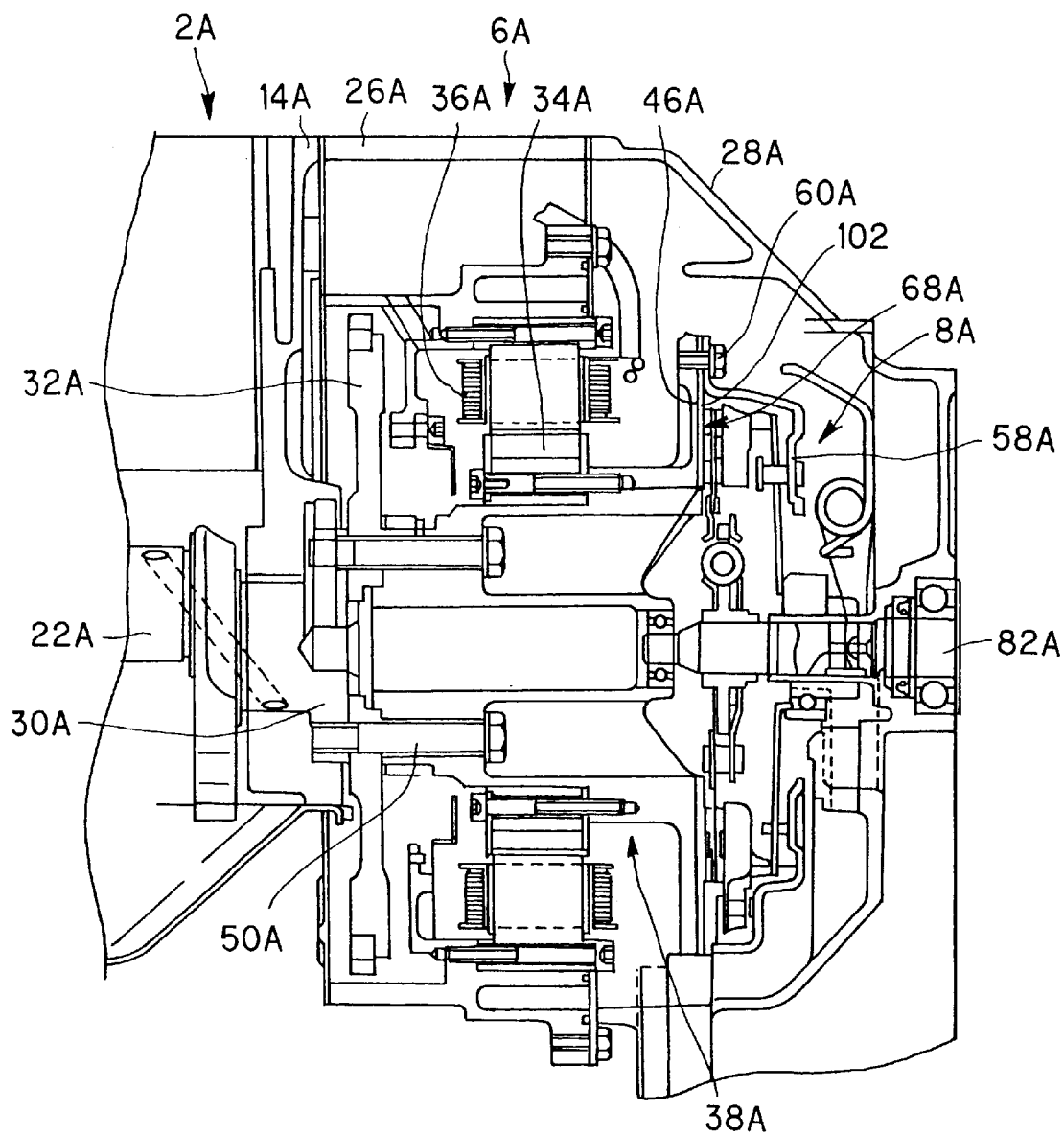
FIG. 3 is an enlarged cross-sectional view, illustrating a motor portion of a propulsion system according to a second embodiment of the invention.

FIG. 3 illustrates a second embodiment. Components which are similar to or identical to components of the first embodiment have the same reference number plus an "A". A propulsion system 2A according to the second embodiment has a steel plate 102 provided on the output side of a second flywheel 46A. The steel plate 102 is an example of a steel member that forms a clutch surface 68A of a clutch 8A. This is done in view of the fact that the second flywheel 46A forms the clutch surface 68A, which second flywheel is made of an aluminum or magnesium alloy having a smaller density. The steel plate 102 is mounted on the second flywheel 46A together with a clutch cover 58A by means of a cover-mounting bolt 60A. The bolt 60A allows the clutch cover 58A to be mounted on the second flywheel 46A.

The propulsion system 2A according to the second embodiment is characterized in that the steel plate 102 is disposed on the output side of the flywheel 46A, which steel plate forms the clutch surface 68A. Such a structure provides reduced torsional vibration of the engine and reduced overall weight of the propulsion system 2A. In addition, the second flywheel 46A made of a material having a smaller density can be formed with the clutch surface 68A having enhanced abrasion resistance. Furthermore, the steel plate 102 is bolted to the second flywheel 46A together with the clutch cover 58A by means of the cover-mounting bolt 60A, with a consequential reduction in cost.

Figure 4:
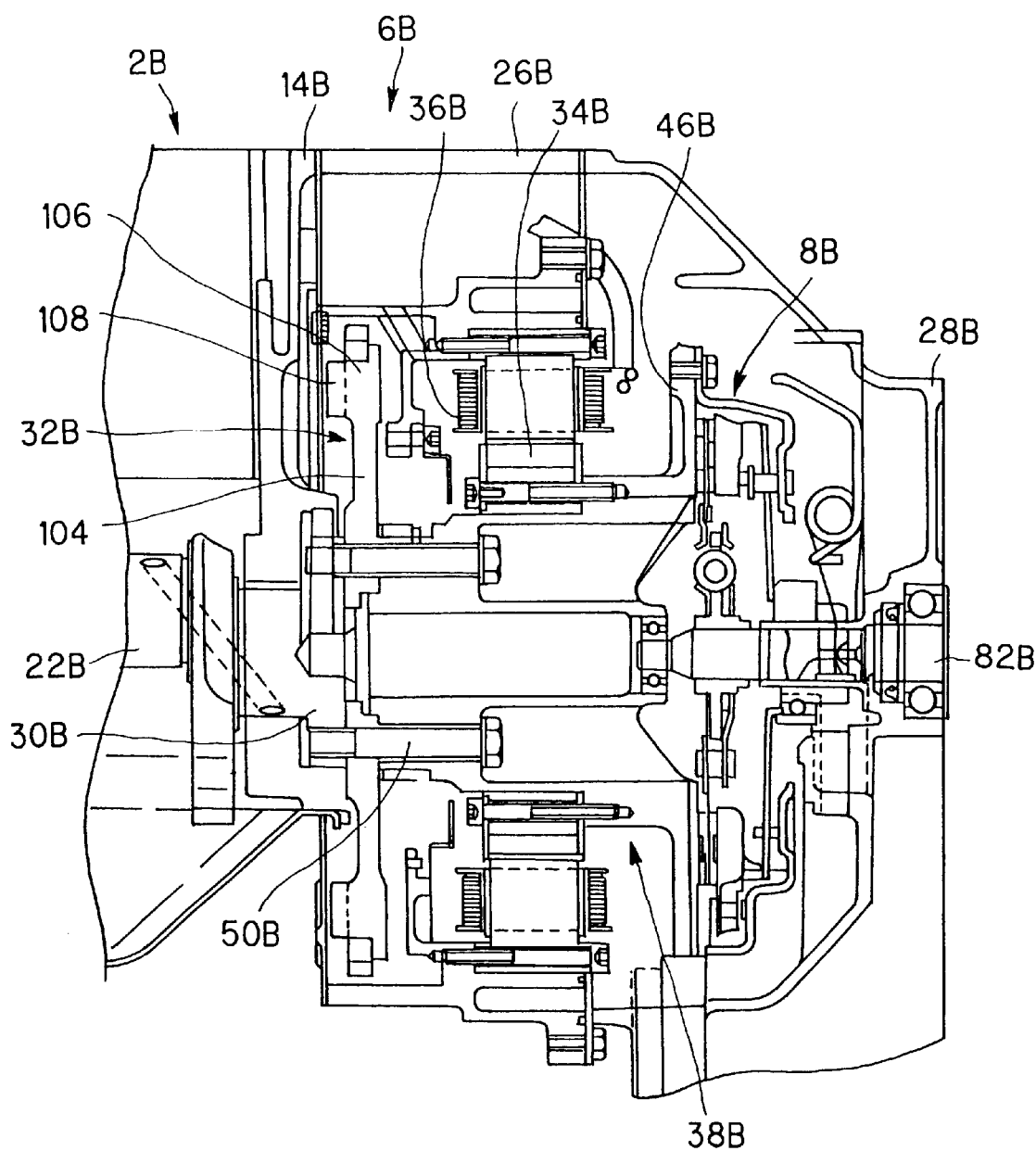
FIG. 4 is an enlarged cross-sectional view, depicting a motor portion of a propulsion system according to a third embodiment of the invention.

FIG. 4 illustrates a third embodiment. Components which are identical or similar to components of the first embodiment are identified with the same reference number plus a "B". In a propulsion system 2B according to the third embodiment, an outer peripheral portion 106 of a first flywheel 32B is formed with an expansion portion 108 although an inner peripheral portion 104 of the flywheel 32B is not defined with such an extension. The first flywheel 32B is formed of either steel or cast iron having a greater density. This is done in order to permit the inertial moment "I1" of the first flywheel 32B positioned near a crankshaft 22B to be set so as to be greater than the inertial moment "I2" of a second flywheel 46B spaced apart from the crankshaft 22B (I1>I2).

The expansion portion 108 on the outer peripheral portion 106 allows for an increase in inertial mass of the outer peripheral portion 106, and thus realizes a further increased inertial moment "I1", with a consequential reduction in torsional vibration of the engine 4.

In one embodiment, the expansion portion 108 has a greater thickness dimension (as measured axially) as compared to the inner peripheral portion 104 of flywheel 32B, and may be formed as a plurality of lugs or blocks which are cantilevered sidewardly from flywheel 32B in circumferentially spaced relation from one another about the circumference of flywheel 32B.

The present invention is not limited to the above, but is susceptible to various variations or modifications. For example, pursuant to the third embodiment, the first flywheel 32B has the expansion portion 108 formed on the outer peripheral portion 106, although the inner peripheral portion 104 does not include such an extension. Alternatively, the outer peripheral portion 106 may be made greater in density than the inner peripheral portion 104 in order to further increase inertial moment "I1", thereby proportionally reducing the torsional vibration of the engine.

As a further alternative, the outer peripheral portion 106 has a plurality of heavyweight spaces defined at circumferentially evenly spaced intervals. The spaces are filled with heavy or dense liquid for adjusting the rotational balance of the flywheel 32B in order to increase the inertial weight thereof. Such increased inertial weight increases inertial moment "I1" of the flywheel 32B, with an incidental reduction in the torsional vibration of the engine. Furthermore, the increased inertial weight of the flywheel 32B provides good rotational balance of the flywheel 32B, which then contributes toward a reduction in the torsional vibration of the engine 4.

As previously described, in the propulsion system according to the present invention, the first flywheel having a greater inertial moment is disposed adjacent to the crankshaft. This is advantageous in view of the torsional vibration of the engine. Further, the second flywheel spaced apart from the crankshaft is formed by a raw material having a small density in order to reduce the inertial moment of the second flywheel. Consequently, the second flywheel can be made lighter in weight than the first flywheel.

As a result, the propulsion system having reduced torsional vibration and reduced overall weight is achievable.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In a propulsion system for a vehicle, having a first flywheel mounted on a crankshaft of an engine at an output end of the crankshaft, the engine being disposed in the vehicle, an electric motor disposed on the first flywheel on an output side of the first flywheel, the motor having a dual function of driving and electric power generation, a second flywheel disposed on the motor on an output side of the motor, and a transmission disposed in communication with an output side of the second flywheel through a clutch, wherein the first flywheel has an inertial moment which is greater than an inertial moment of the second flywheel to reduce torsional vibration of the engine.

2. A propulsion system as defined in claim 1, wherein the first flywheel is made of one of steel and cast iron, and the second flywheel is formed of one of an aluminum alloy and a magnesium alloy.

3. A propulsion system as defined in claim 2, wherein the second flywheel is formed of an aluminum alloy, and a silicon content of the aluminum alloy is at least 15%.

4. A propulsion system as defined in claim 2, wherein a steel member is mounted on the second flywheel on an output side of the second flywheel which faces the clutch.

5. A propulsion system as defined in claim 4, wherein the clutch includes a clutch disk disposed in opposed relation with said steel member and a clutch cover mounted to an outer peripheral edge portion of said second flywheel by a bolt, the steel member being sandwiched between the output side of the second flywheel and the clutch disk and fastened to the second flywheel by the bolt, said clutch disk being movable into engagement with said steel member during engagement of the clutch.

6. A propulsion system as defined in claim 4, wherein the steel member defines a surface which is opposed to and engageable with a clutch disk of the clutch.

7. A propulsion system as defined in claim 1, wherein the first flywheel has an outer peripheral portion having a greater mass than an inner portion thereof to further increase the inertial moment of the first flywheel and reduce torsional vibration of the engine.

8. A propulsion system as defined in claim 7, wherein the outer peripheral portion of the first flywheel includes an expanded portion which extends generally sidewardly from the first flywheel.

9. A propulsion system for a vehicle as defined in claim 1 wherein the first flywheel has a greater density than the second flywheel to provide the first flywheel with the greater inertial moment.

10. A propulsion system for a vehicle as defined in claim 1 wherein the first flywheel is mounted on and rotates with the crankshaft, the motor includes a rotor which is mounted on and rotates with the first flywheel, and the second flywheel is mounted on and rotates with the rotor.

11. A propulsion system for a vehicle as defined in claim 5 further including a pressure plate mounted on the second flywheel, the clutch disk being sandwiched between the pressure plate and the steel member mounted on the second flywheel when the clutch is engaged.

12. A propulsion system for a vehicle, said system comprising an electric motor, an engine including a crankshaft, and a transmission, said motor and said engine both being provided as a source of drive for the vehicle such that the combined driving force of said motor and said engine is transmitted to said transmission, a first flywheel mounted on said crankshaft, said motor being mounted on said first flywheel, a second flywheel mounted on said motor and drivingly connected to said transmission through a clutch, said first flywheel being disposed nearer to said engine than said second flywheel and having a greater moment of inertia than said second flywheel so as to reduce torsional vibration of said engine.

13. A propulsion system as defined in claim 12 wherein said first flywheel has a greater density than said second flywheel.

14. A propulsion system as defined in claim 12 wherein said motor is disposed between said first and second flywheels and said second flywheel is disposed between said motor and said clutch.

15. A propulsion system as defined in claim 12 wherein said first flywheel, said motor, said second flywheel, said clutch and said transmission are disposed in series with one another in the above order starting at said engine.

16. A propulsion system as defined in claim 14 wherein said clutch includes a clutch disk disposed in opposed relation with said second flywheel, and said second flywheel mounts thereon a plate constructed of steel which is disposed to engage said clutch disk during engagement of said clutch.

17. A propulsion system as defined in claim 16 wherein said clutch includes a clutch cover having an outer peripheral portion mounted to an outer periphery of said second flywheel by a fastener, and said plate has an outer peripheral part disposed between said outer peripheral portion of said clutch cover and said outer periphery of said second flywheel and mounted thereto by said fastener.

18. A propulsion system as defined in claim 14 wherein said first flywheel includes an outer peripheral portion which projects in an axial direction and has a greater inertial mass than an inner portion of said first flywheel.

19. A propulsion system as defined in claim 14 wherein said first flywheel is fixed to said crankshaft for rotation therewith, said motor includes a stator stationarily mounted in a motor housing and a rotor which is fixed to said first flywheel for rotation therewith, and said second flywheel is fixed to said rotor for rotation therewith.

\* \* \* \* \*